United States Patent
Shah et al.

(10) Patent No.: US 12,447,680 B2
(45) Date of Patent: Oct. 21, 2025

(54) PARTICLE COATING METHODS FOR ADDITIVELY MANUFACTURED PRODUCTS

(71) Applicants: Carbon, Inc., Redwood City, CA (US); ADIDAS AG, Herzogenaurach (DE)

(72) Inventors: Aayush A. Shah, San Francisco, CA (US); Kai Chen, Sunnyvale, CA (US); Keith Michael Kirkwood, Lake Oswego, OR (US)

(73) Assignees: Carbon, Inc., Redwood City, CA (US); ADIDAS AG, Herzogenaurach (DE)

( * ) Notice: Subject to any disclaimer, the term of this patent is extended or adjusted under 35 U.S.C. 154(b) by 831 days.

(21) Appl. No.: 17/753,999

(22) PCT Filed: Sep. 25, 2020

(86) PCT No.: PCT/US2020/052615
§ 371 (c)(1),
(2) Date: Mar. 21, 2022

(87) PCT Pub. No.: WO2021/062079
PCT Pub. Date: Apr. 1, 2021

(65) Prior Publication Data
US 2022/0371277 A1    Nov. 24, 2022

Related U.S. Application Data

(60) Provisional application No. 62/905,718, filed on Sep. 25, 2019.

(51) Int. Cl.
| | |
|---|---|
| *B29C 64/30* | (2017.01) |
| *B29C 64/124* | (2017.01) |
| *B29K 75/00* | (2006.01) |
| *B29L 31/48* | (2006.01) |
| *B29L 31/50* | (2006.01) |
| *B33Y 10/00* | (2015.01) |
| *B33Y 40/20* | (2020.01) |

(52) U.S. Cl.
CPC ............ *B29C 64/30* (2017.08); *B29C 64/124* (2017.08); *B33Y 10/00* (2014.12); *B33Y 40/20* (2020.01); *B29K 2075/00* (2013.01); *B29L 2031/4821* (2013.01); *B29L 2031/504* (2013.01)

(58) Field of Classification Search
CPC ..... B29C 64/30; B29C 64/124; B29C 64/129; B29C 64/135; B29C 2071/0027; G03F 7/004; G03F 7/027; G03F 7/16; G03F 7/168; B05D 1/06; B05D 1/12
See application file for complete search history.

(56) References Cited

U.S. PATENT DOCUMENTS

| | | |
|---|---|---|
| 4,785,075 A | 11/1988 | Shimp |
| 5,236,637 A | 8/1993 | Hull |
| 5,391,072 A | 2/1995 | Lawton et al. |
| 5,529,473 A | 6/1996 | Lawton et al. |
| 7,052,734 B2 | 5/2006 | Strait |
| 7,055,237 B2 | 6/2006 | Thomas |
| 7,431,959 B1 | 10/2008 | Dehnad |
| 7,438,846 B2 | 10/2008 | John |
| 7,439,299 B2 | 10/2008 | Coogan et al. |
| 7,892,474 B2 | 2/2011 | Shkolnik et al. |
| 8,110,135 B2 | 2/2012 | El-Siblani |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,364,442 B2 | 6/2016 | Steendam et al. |
| 9,453,142 B2 | 9/2016 | Rolland et al. |
| 9,598,606 B2 | 3/2017 | Rolland et al. |
| 9,676,963 B2 | 6/2017 | Rolland et al. |
| 9,962,396 B2 | 5/2018 | Ashton et al. |
| 10,316,213 B1 | 6/2019 | Arndt et al. |
| 10,376,918 B2 | 8/2019 | Kaji et al. |
| 11,027,487 B2 * | 6/2021 | Price ..................... B33Y 80/00 |
| 2013/0292862 A1 | 11/2013 | Joyce |
| 2013/0295212 A1 | 11/2013 | Chen et al. |
| 2013/0330470 A1 * | 12/2013 | Gersch ..................... B05D 1/28 |
| | | 427/180 |
| 2015/0331402 A1 | 11/2015 | Lin et al. |
| 2015/0360419 A1 | 12/2015 | Willis et al. |
| 2016/0288376 A1 | 10/2016 | Sun et al. |
| 2017/0129167 A1 | 5/2017 | Castanon |
| 2017/0129169 A1 | 5/2017 | Batchelder et al. |
| 2017/0173872 A1 | 6/2017 | Mccall et al. |
| 2018/0126630 A1 | 5/2018 | Panzer et al. |
| 2018/0243976 A1 | 8/2018 | Feller |
| 2018/0290374 A1 | 10/2018 | Willis et al. |

OTHER PUBLICATIONS

Dispersed, Oxford English Dictionary, https://oed.com/dictionary/dispersed_adj (last visited May 22, 2025). (Year: 2025).*

(Continued)

*Primary Examiner* — William P Fletcher, III
(74) *Attorney, Agent, or Firm* — Myers Bigel, P.A.

(57) ABSTRACT

Provided is a method of additively manufacturing an object having a particle surface coating thereon, using an intermediate object produced in an additive manufacturing process by light polymerization of a dual cure resin, the intermediate object having residual dual cure resin from which it was produced remaining on a surface portion thereof in unpolymerized form; forming a solid particle coating adhered to the resin coating film; and then further curing the intermediate object.

20 Claims, No Drawings

(56) References Cited

OTHER PUBLICATIONS

International Search Report and Written Opinion corresponding to PCT/US2020/052615; mailed Dec. 7, 2020, (11 pages).
Januszjewicz, Rima, et al., "Layerless fabrication with continuous liquid interface production", PNAS, 113(42), 2016, 11703-11708.
Poelma, Justin, et al., "Rethinking digital manufacturing with polymers", Science, 358(6369), 2017, 1384-1385.
Tumbleston, John R., et al., "Continuous liquid interface production of 3D Objects", Science, 347(6228), 2015, 1349-1352.

* cited by examiner

PARTICLE COATING METHODS FOR ADDITIVELY MANUFACTURED PRODUCTS

CROSS REFERENCE TO RELATED APPLICATIONS

This application is a 35 U.S.C. § 371 national phase application of International Application Serial No. PCT/US2020/052615, filed Sep. 25, 2020, which claims priority from and the benefit of U.S. Provisional Application Ser. No. 62/905,718, filed Sep. 25, 2019, the disclosures of which are hereby incorporated herein in their entirety.

FIELD OF THE INVENTION

The present invention concerns additive manufacturing, and particularly concerns methods of applying a particle coating such as a pigment coating to additively manufactured objects.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Ermoshkin et al., *Continuous liquid interface production of 3D objects*, SCIENCE 347, 1349-1352 (2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (2017).

The variety of objects that can now be produced by additive manufacturing creates a demand for different coloring, pigmenting, and other particle coating of the objects. Unlike techniques such as injection molding, however, additive manufacturing techniques rely on the known optical properties of the resin to effectively cure them. In more sophisticated techniques such as CLIP, a seemingly innocuous change in particle content of the resin can require significant recalibration of the entire additive manufacturing process. Accordingly, there is a need for simple and efficient ways to particle coat additively manufactured objects without unduly complicating the process itself.

SUMMARY OF THE INVENTION

Provided herein according to aspects of the present invention is a method of additively manufacturing an object having a particle surface coating thereon, comprising: (a) providing an intermediate object produced in an additive manufacturing process by light polymerization of a dual cure resin, said resin comprising a mixture of (i) a light polymerizable first component, and (ii) a second solidifiable component that is different from said first component; said intermediate object having residual dual cure resin from which it was produced remaining on a surface portion thereof in unpolymerized (e.g., viscous liquid), form; then (b) partially removing said residual resin from said surface portion of the intermediate object under conditions in which a retained portion of said residual resin remains as a resin coating film on said surface portion; and then (c) contacting said coating film with a dispersed composition comprising, consisting of or consisting essentially of said solid particles (e.g., without the inclusion of a reactive or polymerizable vehicle in the composition) to form a solid particle coating adhered to said resin coating film; and then (d) heating said intermediate object sufficiently to cure said object and said resin coating film to form a cured object having a solid particle surface coating thereon.

In some embodiments, the particles comprise pigment particles (e.g., color pigment particles, scaly pigment particles, flattening agents, etc.). In some embodiments, the particles comprise drug eluting particles.

In some embodiments, the contacting step is carried out by: spraying of said particles (optionally in combination with a propellant and/or a volatile, non-reactive, carrier liquid) or contacting said intermediate object to a fluidized bed of said particles.

In some embodiments, the solid particles have an average diameter of from 10, 50, or 100 nanometers to 10, 50, or 100 microns.

In some embodiments, the intermediate object is produced by bottom-up or top-down stereolithography.

In some embodiments, the partially removing step is carried out by spinning or blowing.

In some embodiments, the light polymerizable first component of the dual cure resin comprises monomers, prepolymers, or both monomers and prepolymers that can be polymerized by exposure to actinic radiation or light (e.g., the first component comprising reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers).

In some embodiments, the second component of the dual cure resin comprises: (a) the precursors to a polyurethane, polyurea, or copolymer thereof (e.g., said second solidifiable component comprising monomers, prepolymers, or both monomers and prepolymers comprising reactive end groups selected from the group consisting of isocyanate/hydroxyl, isocyanate/amine, or combinations thereof), or (b) an epoxy resin, a cyanate ester resin, or a combination thereof (e.g., said second solidifiable component comprising monomers, prepolymers, or both monomers and prepolymers comprising reactive end groups selected from the group consisting of epoxy/amine, epoxy/hydroxyl, or combinations thereof); or (c) a silicone resin.

In some embodiments, the cured object is rigid, flexible, or elastic.

In some embodiments, the object comprises a cushion. In some embodiments, the object comprises a lattice. In some embodiments, the object comprises a midsole or a helmet liner.

Another aspect of the present invention is an object produced by a method as taught herein.

An advantage of some embodiments of the present invention is that the coating compositions can contain ingredients that would be incompatible with, or at least partially disruptive of, the additive manufacturing process, as discussed further below.

Another advantage of some embodiments of the present invention is the creation of a strongly bonded surface coating to an object, such as flexible or elastic objects for which a strong and resilient bond between coating and substrate is important.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

The transitional phrase "consisting essentially of" means that the scope of a claim is to be interpreted to encompass the specified materials or steps recited, and also additional materials or steps that do not materially affect the basic and novel characteristics of the claimed invention as described herein.

1. Dual Cure Resins.

Dual cure resins for additive manufacturing are known and described in, for example, Rolland et al., U.S. Pat. Nos. 9,676,963; 9,598,606; and 9,453,142, and in U.S. Pat. No. 10,316,213 to Arndt et al., the disclosures of which are incorporated herein by reference. Suitable examples include, but are not limited to, resins for producing parts comprised of polymers such as epoxy, cyanate ester, etc., that are formed from a heat polymerizable component, with the resin further comprising light-polymerizable components that photopolymerize during additive manufacturing to form a "green" or "intermediate" three-dimensional object.

As noted above, such resins typically include a mixture of (i) a light polymerizable first component, and (ii) a second solidifiable component that is different from the first component.

In some embodiments, the light polymerizable first component comprises monomers, prepolymers, or both monomers and prepolymers that can be polymerized by exposure to actinic radiation or light (e.g., the first component comprising reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers).

In some embodiments, the second component comprises: (a) precursors to a polyurethane, polyurea, or copolymer thereof (e.g., the second solidifiable component comprising monomers, prepolymers, or both monomers and prepolymers comprising reactive end groups selected from the group consisting of isocyanate/hydroxyl, isocyanate/amine, or combinations thereof), or (b) an epoxy resin, a cyanate ester resin, or a combination thereof (e.g., said second solidifiable component comprising monomers, prepolymers, or both monomers and prepolymers comprising reactive end groups selected from the group consisting of epoxy/amine, epoxy/hydroxyl, or combinations thereof); or (c) a silicone resin.

2. Production of Intermediate Object.

Techniques for additive manufacturing of objects from dual cure resins as described above are known. Suitable techniques include bottom-up or top-down additive manufacturing, generally known as stereolithography. Such methods are described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, Science 347, 1349-1352 (2015); and in R. Januszewcz et al., Layerless fabrication with continuous liquid interface production, *Proc. Natl. Acad. Sci. USA* 113, 11703-11708 (2016). Other examples of methods and apparatus for carrying out particular embodiments of CLIP include, but are not limited to: Batchelder et al., US Patent Application Pub. No. US 2017/0129169; Sun and Lichkus, US Patent Application Pub. No. US 2016/0288376; Willis et al., US Patent Application Pub. No. US 2015/0360419; Lin et al., US Patent Application Pub. No. US 2015/0331402; D. Castanon, S Patent Application Pub. No. US 2017/0129167. B. Feller, US Pat App. Pub. No. US 2018/0243976 (published Aug. 30, 2018); M. Panzer and J. Tumbleston, US Pat App Pub. No. US 2018/0126630 (published May 10, 2018); and K. Willis and B. Adzima, US Pat App Pub. No. US 2018/0290374 (Oct. 11, 2018).

3. Partial Removal of Surface Resin.

After the intermediate object is formed by additive manufacturing, resin on the surface thereof is partially removed such that residual resin is retained as a coating film on the surface, in unpolymerized (e.g., viscous liquid) form. This partial removal may be by any suitable technique, including wiping and gravity separation, but spinning of the part (individually or with a group of other parts) on a centrifugal separator, at a speed and for a time sufficient to centrifugally separate some of the resin from the is object, along with blowing resin off the object with a compressed gas (e.g., air, nitrogen, etc.), either manually or by passing the object under an air knife, is also preferred.

4. Surface Coating.

Coating of the intermediate object may be carried out by contacting the coating film with a dispersed composition comprising, consisting of or consisting essentially of solid particles (e.g., without the inclusion of a reactive or polymerizable vehicle in the composition, e.g., a non-reactive carrier) to form a solid particle coating adhered to said resin coating film.

Solid particles that can be used to coat objects as described herein may be of any suitable size, depending upon the particular mechanism by which they are applied. In general, such particles typically have an average diameter of 10, 50, or 100 nanometers, to 10, 50, or 100 microns.

Numerous pigment particles that can be applied to an object in solid particle form are known and available from suppliers including Just Pigments of Tucson, Arizona, USA; BASF SE; The Chemours Company, Wilmington, Delaware, USA; and Tronox Holdings PLC, New York, New York, USA. Pigments are sometimes referred to or categorized as color pigments, scaly pigments, and flattening agents.

Color pigments that can be used in the processes described herein, include, but are not limited to, metal-based pigments, other inorganic pigments, and organic pigments (including natural and synthetic organic pigments).

Examples of organic pigments include, but are not limited to, alizarin, alizarin crimson, gamboge, cochineal red, rose madder, indigo, Indian yellow, tyrian purple quinacridone, magenta, phthalo green, phthalo blue, pigment red 170, diarylide yellow, etc.

Examples of metal-based pigments include, but are not limited to, cadmium pigments such as cadmium yellow, cadmium red, cadmium green, cadmium orange, cadmium solfoseleenide, etc.; chromiaum pigments such as chrome yellow, chrome green (viridian), etc; cobalt pigments such as cobalt violet, cobalt blue, cerulean blue, aureolin (cobalt yellow) etc; copper pigments such as azurite, Han purple, Han blue, Egyptian blue, Malachite, Paris green, Phthalocyanine Blue BN, Phthalocyanine Green G, verdigris, etc.; Iron oxide pigments such as sanguine, caput mortuum, oxide red, red ochre, Venetian red, Prussian blue, etc.; Manganese pigments such as manganese violint, YlnMn Blue, etc., Mercury pigments such as vermilion; titanium pigments such as titanium yellow, titanium beige, titanium white, titanium black, etc.; zinc pigments such as zinc white, zinc verrite, zinc yellow; etc.

Examples of other inorganic pigments include, but are not limited, to, ultramarine, carbon pigments such as carbon black and ivory black, clay earth pigments such as yellow ochre, raw sienna, burnt sienna, raw umber, burnt umber, etc.

Examples of organic pigments include, but are not limited to, alizarin, alizarin crimson, gamboge, cochineal red, rose madder, indigo, Indian yellow, tyrian purple quinacridone, magenta, phthalo green, phthalo blue, pigment red 170, diarylide yellow, etc.

Particulate flattening agents are known, and are generally irregularly shaped particles that disperse light. Examples include, but are not limited to, silica, diatomaceous earth, heavy metal soaps, talcum, and chalk particles. See, e.g., U.S. Pat. No. 7,439,299.

Pigments may be "scaly pigments" or flake-shaped pigments, such as talc, mica, and glass flakes, such as described in U.S. Pat. No. 10,376,918. Particular examples include metallic and pearlescent pigment particles.

While the present invention is primarily concerned with coating objects with pigment particles (including color pigments, scaly pigments, and flattening agents), the processes described herein may also be used to coat objects with any of a variety of other particles, including but not limited to tackifying particles, anti-microbial particles, absorbent particles, stimuli-responsive particles, conductive particles, drug-eluting particles, polymeric particles, etc.

Drug eluting particles may comprise solid, porous, or hollow particles (e.g., microspheres) comprised of a biodegradable, or non-biodegradable, polymer, containing an active agent such as sirolimus (rapamycin), or more generally an antisense agent, an antineoplastic agent, an antiproliferative agent, an antithrombogenic agent, an anticoagulant, an antiplatelet agent, an antibiotic, an anti-inflammatory agent, a therapeutic peptide, a gene therapy agent, a therapeutic substance, an organic drug, a pharmaceutical compound, a recombinant DNA product, a recombinant RNA product, a collagen, a collagenic derivative, a protein, a protein analog, a saccharide, a saccharide derivative, or a combination thereof, such those agents described in U.S. Pat. No. 7,055,237. Additional examples include but are not limited to those set forth in U.S. Pat. Nos. 9,962,396; 9,364,442; and 7,431,959, the disclosures of which are incorporated herein by reference in their entirety.

5. Further Curing/Baking.

After surface coating, the object is further cured, such as by heating or baking. Heating may be active heating (e.g., in an oven, such as an electric, gas, solar oven or microwave oven, heated bath, or combination thereof), or passive heating (e.g., at ambient (room) temperature). Active heating will generally be more rapid than passive heating and is typically preferred, but passive heating—such as simply maintaining the intermediate at ambient temperature for a sufficient time to effect further cure—may in some embodiments be employed.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

In some embodiments, the heating step is carried out in an inert gas atmosphere. Inert atmosphere ovens are known, and generally employ an atmosphere enriched in nitrogen, argon, or carbon dioxide in the oven chamber. Suitable examples include but are not limited to those available from Grieve Corporation, 500 Hart Road, Round Lake, Illinois 60073-2898 USA, Davron Technologies, 4563 Pinnacle Lane, Chattanooga, TN 37415 USA, Despatch Thermal Processing Technology, 8860 207th Street, Minneapolis, MN 55044 USA, and others.

Depending on the particular choice of polymerizable resin and coating(s) and their constituent ingredients, the optimization of which is within the skill in the art, numerous types of objects can be produced.

Objects can be of any configuration, including solid objects, objects comprised of lattices (including strut lattices and surface lattices), and combinations thereof.

Particular examples of objects that can be produced by the methods described herein include, but are not limited to, decorative or functional/decorative objects such as automotive, airplane, or appliance interior or exterior trim components (e.g., bumper covers), cushions, including helmet liner cushions, bicycle saddles, midsoles for footwear, implantable medical devices such as stents, catheters, etc.

The foregoing is illustrative of the present invention, and is not to be construed as limiting thereof. The invention is defined by the following claims, with equivalents of the claims to be included therein.

We claim:

1. A method of additively manufacturing an object having a particle surface coating thereon, comprising:
   (a) providing an intermediate object produced in an additive manufacturing process by light polymerization of a dual cure resin, wherein said intermediate object is produced by bottom-up or top-down stereolithography, said resin comprising a mixture of (i) a light polymerizable first component, and (ii) a second solidifiable component that is different from said first component; said intermediate object having residual dual cure resin from which it was produced remaining on a surface portion thereof in unpolymerized liquid form; then
   (b) partially removing said residual resin from said surface portion of the intermediate object under conditions in which a retained portion of said residual resin remains as a resin coating film on said surface portion; and then
   (c) contacting said coating film with a dispersed composition comprising solid particles to form a solid particle coating adhered to said resin coating film; and then
   (d) heating said intermediate object sufficiently to cure said object and said resin coating film to form a cured object having a solid particle surface coating thereon.

2. The method of claim 1, wherein said solid particles comprise pigment particles.

3. The method of claim 2, wherein the pigment particles are color pigment particles, scaly pigment particles, or flattening agents.

4. The method of claim 1, wherein said solid particles comprise drug eluting particles.

5. The method of claim 1, wherein said contacting step is carried out by:
   spraying of said solid particles or
   contacting said intermediate object to a fluidized bed of said solid particles.

6. The method of claim 1, wherein said solid particles have an average diameter of from 10 nanometers to 100 microns.

7. The method of claim 1, wherein said intermediate object is produced by bottom-up stereolithography.

8. The method of claim 1, wherein said partially removing step is carried out by spinning or blowing.

9. The method of claim 1, said light polymerizable first component of said dual cure resin comprising monomers, prepolymers, or both monomers and prepolymers that can be polymerized by exposure to actinic radiation or light.

10. The method of claim 1, wherein said second component of said dual cure resin comprises:
    (a) the precursors to a polyurethane, polyurea, or copolymer thereof, or
    (b) an epoxy resin, a cyanate ester resin, or a combination thereof; or
    (c) a silicone resin.

11. The method of claim 1, wherein said cured object is rigid, flexible, or elastic.

12. The method of claim 1, wherein said cured object comprises a cushion.

13. The method of claim 1, wherein said cured object comprises a lattice.

14. The method of claim 13, wherein said cured object comprises polyurethane, polyurea, or a copolymer thereof, and said solid particles comprise pigment particles.

15. The method of claim 1, wherein said cured object comprises a midsole or a helmet liner.

16. The method of claim 1, wherein the contacting step (c) is carried out without the inclusion of a reactive or polymerizable vehicle in the composition.

17. The method of claim 1, wherein said contacting step is carried out by spraying of said solid particles in combination with a propellant and/or a volatile, non-reactive, carrier liquid.

18. The method of claim 1, wherein said light polymerizable first component of said dual cure resin comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

19. The method of claim 1, wherein said second solidifiable component comprises monomers, prepolymers, or both monomers and prepolymers comprising reactive end groups selected from the group consisting of isocyanate/hydroxyl, isocyanate/amine, or combinations thereof, or wherein said second solidifiable component comprises monomers, prepolymers, or both monomers and prepolymers comprising reactive end groups selected from the group consisting of epoxy/amine, epoxy/hydroxyl, or combinations thereof.

20. The method of claim 1, wherein said cured object comprises polyurethane, polyurea, or a copolymer thereof, and said solid particles comprise pigment particles.

* * * * *